A. F. ZAHM.
SYSTEM FOR TESTING PROPELLERS.
APPLICATION FILED JULY 6, 1918.
1,405,177.
Patented Jan. 31, 1922.
2 SHEETS—SHEET 1.
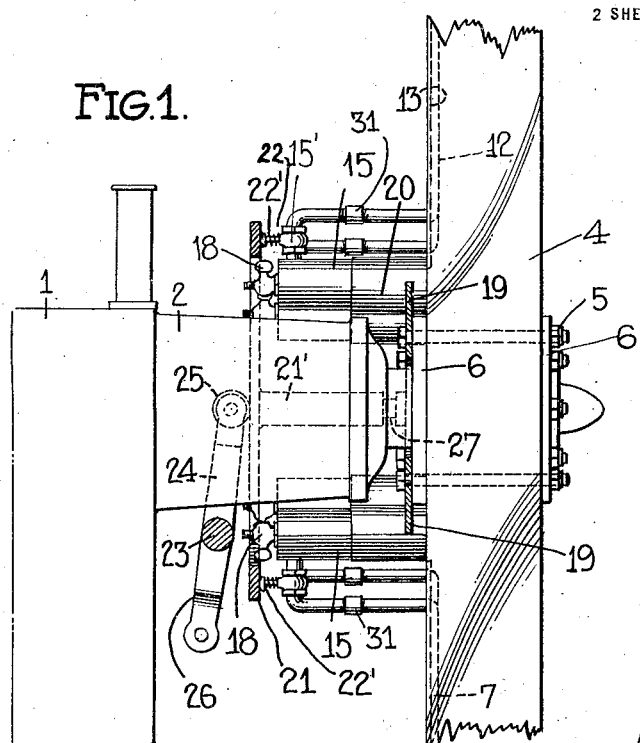
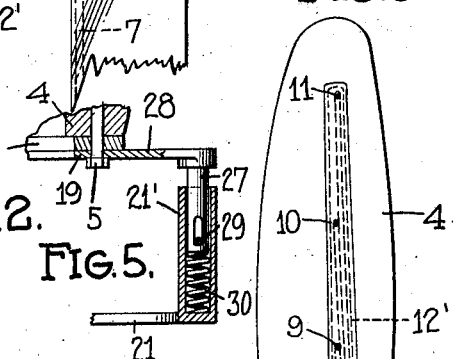
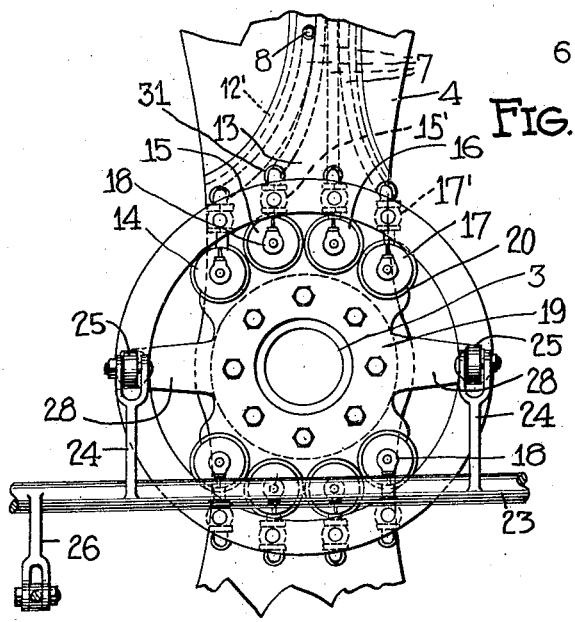
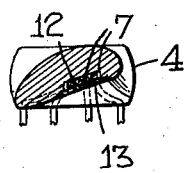
Inventor
ALBERT F. ZAHM.
By
*John R. Carbox*
Attorney

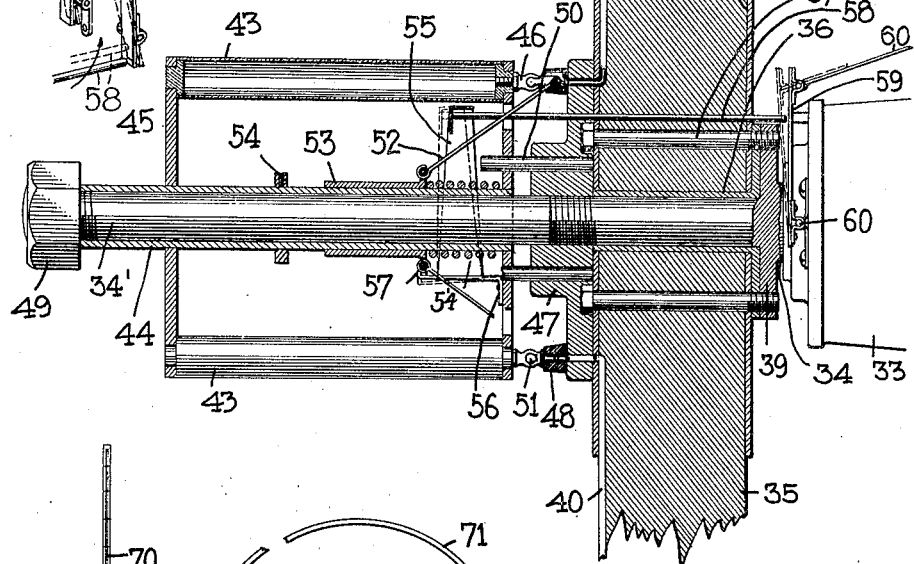
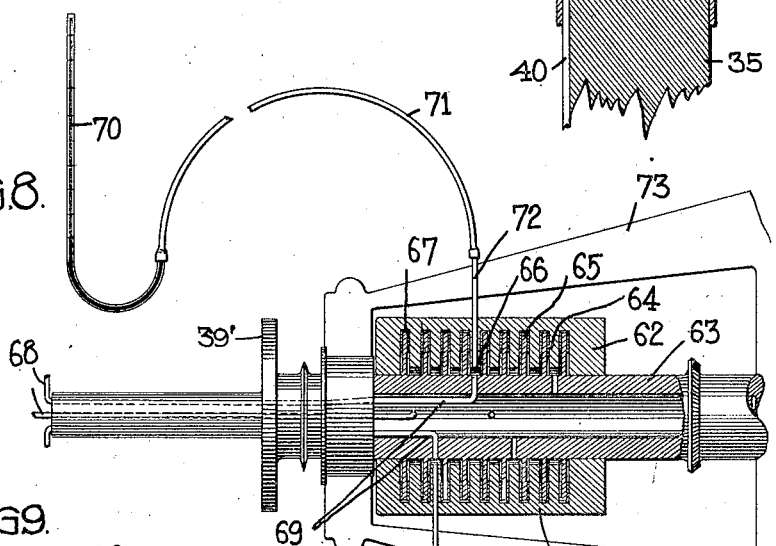
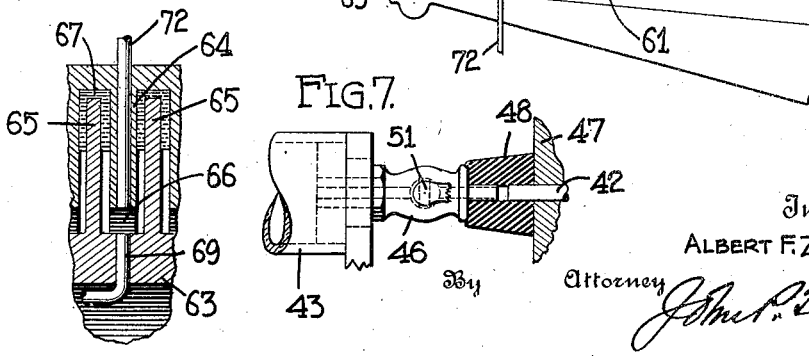

UNITED STATES PATENT OFFICE.

ALBERT F. ZAHM, OF WASHINGTON, DISTRICT OF COLUMBIA.

SYSTEM FOR TESTING PROPELLERS.

1,405,177.   Specification of Letters Patent.   Patented Jan. 31, 1922.

Application filed July 6, 1918. Serial No. 243,659.

*To all whom it may concern:*

Be it known that I, ALBERT F. ZAHM, a citizen of the United States, residing at Washington, D. C., have invented certain new and useful Improvements in Systems for Testing Propellers, of which the following is a specification.

My invention relates particularly to the art of designing and testing aeronautical propellers, although certain features thereof are equally applicable to the design of propellers intended for other and various uses.

It has heretofore been impossible to determine with the required or desired accuracy the actual operating characteristics of the different elements of a propeller blade and accordingly designers have been unable to check or compare the theoretical and calculated results with the actual results obtained in practise. This has resulted in uncertainties and inaccuracies in the design of propellers and the object of my invention is to remove this difficulty and avoid to a great extent these uncertainties and inaccuracies of prior designs. In accordance with my invention, I have devised a system or apparatus whereby the pressure distribution throughout the propeller blade or blades may be accurately determined and recorded, thereby enabling the designer to check up the calculated results and revise his theoretical designs accordingly, if found necessary after comparison with the actual results obtained experimentally.

To this end I embed in the propeller blade one or more ducts which lead respectively to the one or more points or elements on the surface of a propeller blade where the tests are to be made, and I connect these ducts with a pressure responsive, recording or indicating apparatus for experimentally determining the actual wind pressures at the various points selected on the face or back of the blade. These ducts may be connected directly with the pressure measuring apparatus and the pressures determined during the operation of the propeller, as by the provision of a manometer or other pressure device on the aircraft and suitable communicating connections between the manometer and the rotating embedded ducts. The connection with the rotating ducts may take the form of a stationary cylindrical sleeve surrounding the shaft and having radial rings which alternate with circular flanges provided on the rotating shaft, a sealing liquid being contained within said cylindrical sleeve for sealing the annular chambers formed between said flanges against each other during the operation of the device. The manometer connections lead through the sleeve and rings to these annular chambers. Instead of the direct connections the ducts may lead to an intermediate measuring mechanism which may consist of air pressure containers for accumulating air from the various testing points of the propeller blade, the contents of which may be measured to determine the pressure thereof subsequent to the operation of the propeller. The duct openings which terminate on the surface of the propeller blade preferably lead outwardly at substantially right angles to the blade face or back while the ducts terminate at their other ends in the pressure receiving and measuring devices. Specifically, these receiving and measuring devices may consist of metallic air tight containers whose communication with the ducts may be established or interrupted by some such means as shut-off cocks at the will of the operator or the pilot. Thus the propeller may be operated at any desired speed while the aeroplane is in flight and with the reservoirs or receivers open to the ducts, and while the motor continues operating at that speed the containers or reservoirs may be shut off by the pilot, thereby confining therewithin air at the pressures of the respective points or elements on the blade face connected with the ducts. The reservoirs may then be dismounted from the propeller hub or may be dismounted from the propeller shaft with the propeller and the hub, and each reservoir may individually be connected with manometer tubes for the measurement of the pressure of the confined and entrapped air.

In the specific embodiments illustrating the indirect method of attachment to the manometer, I have shown the containers as carried by the propeller hub and as having petcocks to which the manometer tubes may be connected, and I have illustrated a common means for simultaneously opening and closing the shut-off cocks of all containers, this control means being under the control of the pilot or other operator, but it is understood that the invention may be practiced and embodied in apparatus other than the specific devices hereinafter set forth.

For a better understanding of my invention, reference may be had to the accompanying drawings, which illustrate certain embodiments of the many forms my invention is capable of assuming, wherein—

Fig. 1 is a side elevation illustrating one embodiment of the propeller shaft, propeller and the pressure testing apparatus, certain parts being illustrated in section, Fig. 2 is an end view thereof, Fig. 3 is a side view of one of the propeller blades, Fig. 4 is a section on the line 4—4 of Fig. 3, Fig. 5 is a sectional view of a part of the operating mechanism, Fig. 6 is an elevation illustrating a second modification of my invention, also partly in section, Fig. 7 is a detail thereof, Fig. 8 is an elevational view, partly in section, of a third modification, and Fig. 9 is a detail thereof.

And Figure 10 is a detailed view of an element of the operating mechanism.

Referring to the drawings where like numerals refer to like parts throughout, 1 indicates the end of a fuselage of an aeroplane which carries the usual and ordinary bearing housing 2 for the propeller shaft 3. The propeller 4 illustrated is of the two blade type, and is fixed to the propeller hub as usual by the transverse bolts 5 which pass through the blades and engage flanges 6 on the opposite sides thereof. The propeller as a whole including the hub, is fixedly mounted on the reduced end of the shaft 3 as is well understood in this art. Each propeller blade has embedded therein a plurality of ducts 7, and in the specific instance illustrated, there are four of such ducts in each blade, the ducts in one blade only being shown, since the ducts are duplicated in the two blades. These ducts 7 lead to the different points or elements of the blade face that are to be tested out, and it is understood that these points or elements may be located at various positions selected over the entire face of the blade. In the embodiment here shown (see Fig. 3) the four points for the respective ducts 7 are positioned substantially in the center line of the propeller blade and are denominated 8, 9, 10 and 11, respectively. The ducts at these points open out through the face of the propeller and preferably lead outwardly at right angles to the face. These ducts 7 may be in the form of light copper or steel tubes of very small diameter, and may be conveniently embedded in the propeller blade by first forming a small shallow groove or trench 12 longitudinally of the face of the blade which is illustrated in the drawings as flared out at the bottom of the blade to permit the spreading of the ends of the tubes. The tubes or ducts 7 are disposed within the groove, and the groove is then covered or bridged by a thin strip of suitable material as veneering 13. This strip 13 rests upon a shoulder 12′ surrounding this groove and is fixed to it in any convenient manner as by gluing. The strip 13 forms a surface continuous with the face of the blade, so that there are no interruptions or irregular surfaces to interfere with the proper or normal operation of the blade. It is understood that this strip 13 is provided with openings at 8, 9, 10 and 11 substantially of the diameter of the ducts 7, which openings register with the collecting ends thereof. The ducts 7 at the bottom of the blade lead outwardly from and transversely of the blade face and extend horizontally to the rearward ends of cylindrical containers 14, 15, 16 and 17 respectively, these containers or pressure receiving reservoirs being of light metal and being provided with individual shut-off cocks 14′, 15′, 16′ and 17′ respectively. The ducts 7 after emerging from the propeller blade communicate with the containers through these shut-off cocks, whereby communication may be established or interrupted between the ducts and the containers at the will of the operator or pilot. The containers are also provided with means for connection with pressure responsive apparatus, as for instance a manometer tube, and, as shown, this means of attachment comprises petcocks and nozzles 18 leading outwardly through the ends of the containers. The containers are conveniently carried by the propeller hub and for this purpose the hub on its rear end is provided with a plate or carrier 19, which encircles the shaft 3 and is clamped to the hub by means of the bolts 5 as illustrated in Fig. 1. This plate 19 carries on its periphery a receptacle or other supporting member 20 for each of the containers or reservoirs, and these supporting members 20 preferably correspond in shape to the exterior of the containers and are also preferably formed integral with the plate 19. For actuating the shut-off cocks there is provided an operating mechanism which comprises a ring 21 surrounding the bearing housing 2 and carried by the plate or carrier 19. For this purpose the ring 21 has formed on the opposite ends of the diameter a pair of barrels or cylindrical members 21′, these members extending parallel to the shaft 3 and receiving plungers 27 carried by arms 28 which extend outwardly from the plate 19. The ring may thereby receive axial movement for engaging and actuating the spring pressed valve stems 22, each member 21′ being provided with a stop pin 29 which plays in a groove or slot in the plunger for limiting this movement in both directions. Each member or barrel 21' also has a compression spring 30 disposed behind the plunger 27 for normally maintaining the ring 21 out of engaging relation with the valve stems. These valve stems 22 are provided with compression springs 22' for the purpose of normally maintaining the shut-off cocks in a closed position, that is the cocks are maintained closed except when engaged and actuated by the ring 21. Disposed on some convenient part of the fuselage is located a rock-shaft 23 which extends transversely of the bearing 2 and slightly therebelow. On each side of the bearing the rock-shaft 23 is provided with an upwardly extending arm 24 (preferably integrally formed thereon) and these arms carry actuating rollers 25 for engagement with the ring 21 as illustrated in Figs. 1 and 2. The shaft 23 also carries a crank arm 26 which may be connected with the operator's control lever by means of connecting links, these connecting devices not being shown in the drawings for convenience in illustration. It is understood, however, that the operator or pilot at any time during the flight may actuate the shut-off cocks through the medium of the rock-shaft 23 and actuating rollers 25, the shut-off cocks 14', 15' 16' and 17' thereby being operated simultaneously.

When it is desired to determine the air pressure on the propeller blade at the various points selected and indicated, the pilot, through the medium of the rock-shaft 23 and other actuating devices illustrated, forces the ring 21 as a unit toward the propeller and thereby operates the various cocks 14', 15', 16' and 17' against the tension of the closing springs 22' which surround the valve stems. When these shut-off cocks are opened, the containers receive and accumulate air from the mouths of their respective ducts 7, this accumulated air being at the pressure corresponding to the various points or elements 8, 9, 10 and 11 on the propeller blade, and after they are permited to collect air for a sufficient length of time to become filled with air at the pressures corresponding to the various points, the operator then withdraws the cam rollers from engagement with the ring 21, thereby permitting the shut-off cocks to be closed by their corresponding springs 22'. The flight is then discontinued and the air containers are connected up with a suitable pressure responsive and indicating apparatus, as by means of manometer tubes attached to the petcocks 18, whereby the pressure of the air entrapped in each cylindrical container may be individually measured and determined. The containers may be removed from the fuselage of the machine with the propeller as a unit, or if desired, detachable connections 31 might be provided in the horizontal portions of the tubes between the containers or shut-off cocks and the ducts 7 whereby the containers individually may be removed from the mounting and the air pressures therein determined. It is understood that the clearance between the stems 22 and ring 21 in its retracted position is sufficient to permit the removal of the detachable connections 31 without opening the cocks. After removal of these connections the containers may be rotated in their receptacles so as to bring the valve stems 22 out of the path of the ring 21 (starting at either end) and the containers may then be removed axially from their receptacles or holders.

A second modification of my apparatus for exploring the surface of a propeller blade is illustrated in Fig. 6, wherein is shown a housing 33 for the bearing of the propeller shaft 34, the propeller 35 being indicated as securely anchored and fixed to the propeller hub sleeve 36. A number of bolts 37 are illustrated for securely clamping the propeller 35 between opposed plates 38 and to a flange 39 formed integrally on the propeller shaft 34. It is understood, however, that the particular propeller mounting forms no part of the invention claimed in the present application. The ducts embedded in the propeller blade are indicated at 40 and at their inner ends terminate in the right angle portions 42. For supporting and carrying the demountable pressure containers 43 the shaft 34 is illustrated as being extended beyond the opposite side of the propeller 35 to form an extension 34' which carries the containers 43 and the actuating mechanism on the opposite side of the propeller instead of between the propeller and the driving motor. The apparatus is mounted as a unit upon a sleeve 44 which is adapted to be inserted over the extension 34' of the shaft 34. Containers 43 are securely fixed to and between a pair of opposed circular plates 45, these plates surrounding the sleeve 44 and being brazed thereto or otherwise suitably assembled in fixed position. The containers 43 on their inner ends are provided with connections 46 which are adapted to communicatingly register with the right angle portions 42 of the embedded ducts 40 when the unit is assembled on the extension 34'. An annular member 47 (preferably of wood) is fixed to the outer side of the propeller around the shaft extension 34', the portion thereof near the periphery being provided with transverse openings for the reception of the right angle portions 42 of the ducts, these ducts extending therethrough and slightly beyond as indicated in the drawings. One side of this member 47 is provided with transverse openings for the reception of the heads of the bolts 37 whereby the member 47 may be brought securely into engagement with the outer clamping flange 38 and a driving connection therebetween may be formed. A container unit is brought into operative position by inserting the sleeve 44 over the extension 34', bringing the containers 43 with their connections 46 in alignment and registering with the ducts 42. For establishing an air-tight connection between the containers 43 and the ducts 42 there is provided a rubber plug 48 which has an opening passing therethrough for the reception of the connections 46 and the ducts 42 and is adapted to be wedged tightly between the connections 46 and the member 37 as indicated in Figs. 6 and 7, the extension 34' being provided with a clamping nut 49 for drawing these parts together in a manner to secure an air-tight fitting. For providing a positive driving connection between the container unit and the member 47 there are provided a plurality of driving members or rods 50 which pass transversely through the member 47 and the inner plate 45, as indicated. The connections 46 are provided with shut-off cocks 51 which may be opened or closed to establish or interrupt communication between the containers 43 and the ducts 40. In a manner similar to the arrangement of Fig. 1, operating devices are provided whereby these shut-off cocks may be controlled from the operator's seat on the aircraft. For this purpose the shut-off cocks 51 are provided with operating links 52 which are in turn connected to eyes formed in the transverse flange on a sleeve 53, the latter being slidable back and forth on the sleeve 44 for opening and closing the valves. A stop 54 is provided for limiting the outward movement of this actuating sleeve 53, a spring 54 being provided around the sleeve 44 and being disposed between the inner circular plate 45 and the sleeve 53 for constantly urging the sleeve 53 in an outward direction to close the shut-off cocks 51. The cocks 51 may be simultaneously opened and latched in the open position by means of a latch member comprising a standard 55 carried by an integral spring arm or latch 57 attached as at 56 to the inner side of the plate 45, illustrated in Fig. 6. This latch may be sprung into engagement with the flange on the end of the sleeve 53 whereby the spring 54 is held under compression and the cocks 51 are maintained in an open position, establishing communication between the containers 43 and the ducts 40. The latch 57 may be sprung to the position indicated in dotted lines for releasing the sleeve 53 and for this purpose a push rod 58 is provided which passes transversely through the propeller hub and the hub flange with its outer end in engagement with an abutment or ear formed on the standard 55. The inner end of this push rod 58 is disposed in the path of a stationary tripping member 59, this member being pivoted at 60 to the end of the bearing housing 33, the upper end thereof having attached thereto a connecting rod or link 60 which leads to actuating devices (not illustrated) disposed in a convenient place near the operator or pilot. In accordance with this modification of the invention the shut-off cocks 51 are all set in an open position as indicated, by forcing the sleeve 53 toward the propeller against the tension of the spring 54' until the spring trigger 57 snaps over the flange on the end of this sleeve. This is done, of course, before the motor and propeller are started. After the machine has been started and the propeller is operating at the required test speed, the operator or pilot pushes outwardly on the connecting link 60 thereby causing the trip lever 59 to take a position in the path of the end of the push rod 58 and this push rod in turn trips the latch 57 through the medium of the standard 55 which is formed a part thereof. Upon the release of the sleeve 53 the spring 54' causes an automatic closure of all the shut off cocks thereby enclosing or trapping air in the containers 43 at the pressures corresponding to the various points on the surface of the propeller being explored. The machine thereupon is brought to rest and the containing unit removed from the shaft extension 34' by removal of the nut 49 whereupon the pressures of the various containers may be measured and determined by connecting the manometer or other pressure responsive or indicating devices with the nipples on the end of the connections 46, the measuring of the pressure in these containers being accomplished in a manner similar to that of the modification illustrated in Figs. 1 to 5.

In Figs. 8 and 9 I have illustrated another modification of my invention, this modification being particularly distinguished from the above described modification by the provision of means for measuring the pressures on the surface of a propeller blade during the operation thereof instead of trapping the air in pressure containers and subsequently measuring the pressure of the entrapped air as set forth above. In accordance with this modification the measuring apparatus has a manometer connected directly with exploring ducts on the surface of the propeller blade while the propeller is operated, whereby at any time while the propeller is being operated and at any speed the wind pressures thereon may be determined by a simultaneous inspection of the measuring apparatus or by other appropriate means. For accomplishing this purpose I dispose on the propeller shaft a stationary sleeve 61, this sleeve being of a cylindrical exterior form and having end flanges 62 formed integrally therewith and serving as bearing members against the shaft 63. The interior of this cylindrical sleeve 61 is provided with a plurality of radial circular flanges 64 and alternating with these flanges or rings 64 are a plurality of sealing flanges 65 indicated in the present instance as formed integrally on the shaft 63. These sealing flanges 65 are of a circular form and project into proximity to the periphery of the sleeve 61 thereby forming a multiplicity of chambers 66 around the shaft 63, disposed between these sealing flanges. For insuring an airtight seal between these various chambers 66, a sealing liquid 67 is contained in the chambers enclosed by the sleeve 61 which upon rotation of the shaft 63 at the operating speeds of the propeller is thrown out by centrifugal force against the interior of the periphery of the sleeve 61 in the manner indicated to effect a perfect seal between the flanges 65 and the sleeve. The annular chambers 66 are thereby provided around the shaft 63, each of them being effectively sealed against the outside atmosphere of the other chambers. The exploring ducts, which it is understood are embedded in the propeller blade in a manner similar to that indicated in the above described modifications are indicated at 68, these ducts passing radially down the propeller blades to the end of the shaft and thence inwardly and longitudinally through the interior thereof, the shaft being made hollow for this purpose. The inner ends 69 of these ducts are bent at right angles to the shaft 63 and are sealed in transverse openings therein leading to the annular chambers 66. One of the measuring devices is illustrated diagrammatically at 70 and is indicated as having a connection 71 leading to the stationary pipe or duct connection 72. These stationary ducts 72 pass transversely through the sleeve housing indicated diagrammatically at 73, transversely through the sleeves 61 and through the rings 64, terminating in the annular chambers 66. In accordance with this modification the ducts 68 lead the wind pressures collected at the various exploration points on the propeller surface to the accumulating chambers 66, and accordingly these chambers accumulate air at pressures corresponding to the pressures on the elements of the propeller blade. The manometer 70, or other pressure responsive devices, is used to indicate the pressure of the accumulated air in these annular chambers 66 and accordingly the wind pressures on the various points selected on the propeller blades may be determined and recorded during and while the propeller is running at any particular speed and load desired for the tests, it being understood that the devices are more or less diagrammatically illustrated and that the designs and proportions and location thereof may be variously modified to suit the different requirements met with in practice.

The pressures at the various points selected having been experimentally determined, the results obtained may be compared with the theoretically calculated or expected values, and if the theoretical and the experimentally determined results are widely at variance, the designer is in a position to make the necessary changes in and revision of his designs. A propeller may thus be obtained whose efficiency and operating characteristics are in accordance with the expected values.

I have thus set forth one complete embodiment of my invention in the specific manner required by the patent statutes, but it is understood that the claims annexed hereto are not to be limited to the specific devices illustrated in the drawings except as is specifically recited thereon, but are to be given a scope commensurate with the spirit of the invention.

What is claimed is:

1. In a system for determining the pressure distribution on the surface of a propeller blade, the combination of a duct embedded in the propeller blade and terminating at one end at a point on the surface of the blade, with means at the other end of the duct for attachment to a pressure responsive device.

2. In a system for determining the pressure distribution on the surface of a propeller blade, the combination of a duct embedded in the propeller blade, said duct opening outwardly at one end at a point on the surface of the blade, with means at the other end of the duct for attachment to a pressure responsive device.

3. In a system for determining the pressure distribution on the surface of a propeller blade, the combination of a plurality of ducts embedded in the propeller blade and terminating at one end at different points on the surface of the blade, with means at the other ends of the ducts for attachment to a pressure responsive device.

4. In a system for determining the pressure distribution on the surface of a propeller blade, the combination of a plurality of ducts embedded in the propeller blade and terminating at one end at different points on the surface of the blade, said ducts opening outwardly at right angles to the surface face, with means at the other ends of the ducts for attachment to a pressure responsive device.

5. In a system for determining the pressure distribution on the surface of a propeller blade, the combination of a plurality of ducts embedded beneath the surface of the propeller blade and terminating at one end at different points on the surface of the blade, with means at the other end of the ducts for attachment to a pressure responsive device.

6. A system for determining the pressure distribution on the surface of a propeller blade, the combination of a plurality of ducts embedded beneath the surface of the propeller blade and terminating at one end and opening outwardly at different points on the surface of the blade, with means at the other end of the ducts for attachment to a pressure responsive device.

7. In a system for determining the pressure distribution on a face of a propeller blade, the combination of a plurality of ducts embedded in the propeller blade and terminating at one end in mouths opening outwardly substantially at right angles to the face of the blade at different points thereon, with means at the other end of the ducts for attachment to a pressure responsive device.

8. In a system for determining the pressure distribution on the face of a propeller blade, the combination of a duct embedded in the propeller blade and terminating at one end at a point on the face of the blade, with means at the other end of the duct for attachment to a pressure registering means.

9. In a system for determining the pressure distribution on the surface of a propeller blade, the combination of a duct embedded in the propeller blade and terminating at one end at a point on the surface of the blade, with means at the other end of the duct for receiving the air under pressure taken from the surface of the blade while in operation.

10. In an apparatus of the type set forth, a propeller blade having on the surface thereof an air collecting inlet or mouth and a communicating passage therein leading from said inlet to a pressure responsive device.

11. In a system for determining the pressure distribution on the surface of a propeller blade, the combination of a plurality of ducts embedded in the propeller blade and terminating at one end on the surface of the blade, with means at the other end of the ducts comprising a rotating and a stationary member for attachment to pressure responsive devices during the operation of the propeller.

12. In a system for determining the pressure distribution on the surface of a propeller blade, the combination of a plurality of ducts embedded in the propeller blade and terminating at one end on different points of the surface of the blade with means comprising a plurality of communicating chambers for attachment to a pressure responsive device during the operation of the propeller.

13. In a system for determining the pressure distribution on the surface of propeller blades, the combination of a duct embedded in the propeller blade and leading at one end to the point on the propeller surface to be explored, with means at the other end of said duct for accumulating air pressure during the operation of the propeller blade, and a pressure responsive and measuring device comprising means for communication with said first mentioned means during the operation of the propeller.

14. In a system for determining the pressure distribution on the surface of the propeller blade, in combination, a plurality of ducts embedded in the propeller blade, said ducts terminating at one end on the different points of the blade to be explored and terminating at the other end in annular chambers formed between a plurality of axially spaced flanges formed on the propeller shaft, a stationary member surrounding said flanges having a plurality of radially disposed rings, said rings alternating with said flanges and projecting radially inwardly within said annular chambers, means for sealing the said chambers against each other, and a pressure responsive apparatus having duct connections leading downwardly to said sealed chambers for the purpose set forth.

15. In a system for determining the pressure distribution on the surface of a propeller blade, the combination of a duct embedded in the propeller blade and terminating at one end on the surface of the blade, said duct passing axially of the propeller shaft and terminating on the periphery thereof between a pair of transverse flanges formed thereon, a sealing member surrounding said shaft and said flanges, said member having three radially disposed rings alternating with and enclosing said flanges, a sealing liquid contained within said sealing member and adapted to seal the annular space between said flanges and said sealing member and a pressure responsive device having a duct connection leading through the intermediate one of said rings to the annular chamber formed thereby between said flanges and in communication with said exploring duct.

16. In a system for determining the pressure distribution on the surface of a propeller blade, in combination, a hollow propeller shaft having a plurality of axially spaced transverse circular flanges on the exterior thereof, a propeller mounted on said shaft and having embedded therein a plurality of exploring ducts leading at one end to different points on the surface of the propeller and at the other end to the annular spaces or chambers formed on the exterior of said shaft between said transverse flanges, a stationary cylindrical member having transverse bearing members on the end thereof engaging the said shaft and enclosing said transverse flanges, said member having a plurality of sealing rings on the interior thereof, which alternate with said flanges and project inwardly therebetween toward the periphery of said shaft, a sealing liquid contained within said enclosing member, and a plurality of pressure responsive devices having connections leading transversely through said member and through said sealing rings to said annular chambers in communication with said exploring ducts.

In testimony whereof I hereunto affix my signature.

ALBERT F. ZAHM.